United States Patent
Galins (10) Patent No.: US 6,574,285 B2
(45) Date of Patent: Jun. 3, 2003

(54) 128-ARY SIGNAL CONSTELLATIONS SUITABLE FOR NON-LINEAR AMPLIFICATION

(75) Inventor: Joseph E. Galins, Manhattan Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 9 days.

(21) Appl. No.: 09/906,319

(22) Filed: Jul. 16, 2001

(65) Prior Publication Data

US 2003/0021358 A1 Jan. 30, 2003

(51) Int. Cl.[7] .............................. H04L 25/49
(52) U.S. Cl. .................. 375/297; 375/296; 375/278; 375/285
(58) Field of Search ................... 375/297, 295, 375/296, 298, 259, 271, 278, 284, 285, 261, 265, 324, 340; 455/108, 110, 102

(56) References Cited

U.S. PATENT DOCUMENTS

| | | | | |
|---|---|---|---|---|
| 5,493,586 A | * | 2/1996 | Brownlie et al. | ........... 375/261 |
| 5,623,516 A | * | 4/1997 | Brownlie et al. | ........... 329/304 |
| 5,774,500 A | * | 6/1998 | Zogakis et al. | ............. 375/261 |
| 6,115,415 A | * | 9/2000 | Goldstein et al. | ........... 375/222 |
| 6,373,902 B1 | * | 4/2002 | Park et al. | .................. 332/124 |

OTHER PUBLICATIONS

C. Melvil Thomas, Michael Y. Weidner, and S.H. Durrani, Digital Amplitude–Phase Keying with M–ary Alphabets, IEEE Transactions on Communications, vol. Com–22, No. 2, Feb. 1974.

* cited by examiner

Primary Examiner—Chi Pham
Assistant Examiner—Khanhcong Tran
(74) Attorney, Agent, or Firm—Harness, Dickey & Pierce, P.L.C.

(57) ABSTRACT

A communications system (10) which utilizes an 128-ary QAM signal constellation suitable for non-linear applications. The communications system includes a modulator (18) for utilizing the 128-ary constellation to implement the modulation. The 128-ary constellation is a circular constellation which provides a simplified amplitude predistortion by utilizing the subject 128-ary constellations, enabling more efficient communications can then be achieved through a peak-power-limited non-linear channel (16). Such non-linear channels (16) are more power efficient at creating RF energy from DC energy.

28 Claims, 6 Drawing Sheets

128-ARY SIGNAL CONSTELLATIONS SUITABLE FOR NON-LINEAR AMPLIFICATION

CROSS REFERENCE TO AWAITED APPLICATIONS

This application is a related application to U.S. application Ser. No. 09/883,651, filed Jun. 18, 2001, the disclosure of which is incorporated by reference.

FIELD OF THE INVENTION

The present invention relates generally to communications systems utilizing 128-ary modulation formats and, more particularly, to an apparatus and method for efficiently communicating through a peak-power-limited, non-linear channel.

BACKGROUND OF THE INVENTION

In high data rate communications systems, such as selected satellite communications systems, data transmission typically employs high power amplifiers such as traveling wave tube amplifiers (TWTAs) or solid state power amplifiers (SSPAs). Such high speed communications systems typically require a relatively high output power so that the signal being transmitted can travel greater distances before being significantly attenuated. However, such power is limited by several considerations, including the limited energy generation and storage in the satellite vehicle. In these types of communications systems, low frequency digital baseband signals comprising the stream of digital data bits are transmitted after being modulated onto a high frequency carrier wave.

Various modulation schemes exist and distinguish between the digital bits. Examples of digital modulation schemes include amplitude-shift keying (ASK), binary phase-shift keying (BPSK), quadrature-phase shift keying (QPSK), and quadrature amplitude modulation (QAM). Further, the digital baseband signal may be multi-level (M-ary) signals requiring multi level modulation methods.

Quadrature modulation schemes provide both amplitude and phase modulation of the carrier because both complex and imaginary representations of the signals are used. In quadrature amplitude modulation schemes, such as QAM, each bit is converted through a bit symbol representing a complex value having an in-phase, real component and a quadrature-phase, imaginary component. Each bit is represented on a graph having an imaginary axis and a real axis to form a constellation pattern representing a group of signals positioned within a circle around the origin of the axes. The distance from the origin represents the amount of power being transmitted. For example, four bits transmitted at a particular time may be represented as 16 symbols. Each symbol of the pattern identifies a complex voltage value having an in-phase component and a quadrature-phase component and represents the complex voltage value for a particular symbol period which is the time during which each symbol is transmitted. The symbols of the constellation pattern are geometrically spread so that they are more equally spaced apart to more readily distinguish the symbols and reduce bit errors. The constellation patterns are processed through the transmitter without being distorted so that the bits are readily distinguishable from each other at the receiver end.

High power amplifiers are desirable in high speed communications applications because they provide high gain over wide bandwidths. However, the input signal to a high power amplifier must be controlled because the high power amplifier exhibits non-linear transfer characteristics. At lower input powers, the output-input power relationship of the high power amplifier is approximately linear. At peak power output, the high power amplifier saturates, and further increases the input power beyond the saturation point actually decrease the output power of the amplifier.

Non-linear amplifiers are inherently more power efficient at creating radio frequency (RF) energy from direct current (DC) energy but create distortions in the process. Such distortions significantly complicate utilizing traditional signal constellations, such as M-ary QAM. Non-linear channels cause the constellation to rotate and expand non-uniformly. Various methods are available to compensate for this expansion and rotation, but such methods are complex and may be difficult to implement.

The non-linearity of the high power amplifier affects the position of the symbols in the constellation pattern by moving them away from the origin. It is known to provide amplifier predistortion techniques in the amplifier when the transmitter is being operated in its non-linear range near peak output power.

Thus, it is desirable to provide an efficient communications system utilizing a peak-power-limited, non-linear channel which compensates for distortion.

SUMMARY OF THE INVENTION

A communications system comprising a modulator for modulating a digital data stream onto a carrier wave to generate a modulated signal, the modulator converting data in the data stream into symbols for transmission by the communications system, the symbol being encoded into one of M possible symbols of an M-ary constellation, wherein each symbol is defined by one of a plurality of phases and one of a plurality of magnitudes and an amplifier for amplifying the modulated signal prior to transmission to generate an amplified signal, the amplifier having a non-linear characteristic that generates a non-linear distortion in the modulated signal, wherein the M-ary constellation is a 128 point constellation having varying magnitudes with a varying number of points located on each magnitude.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DESCRIPTION OF THE PREFERRED EMBODIMENT

Figure 1:
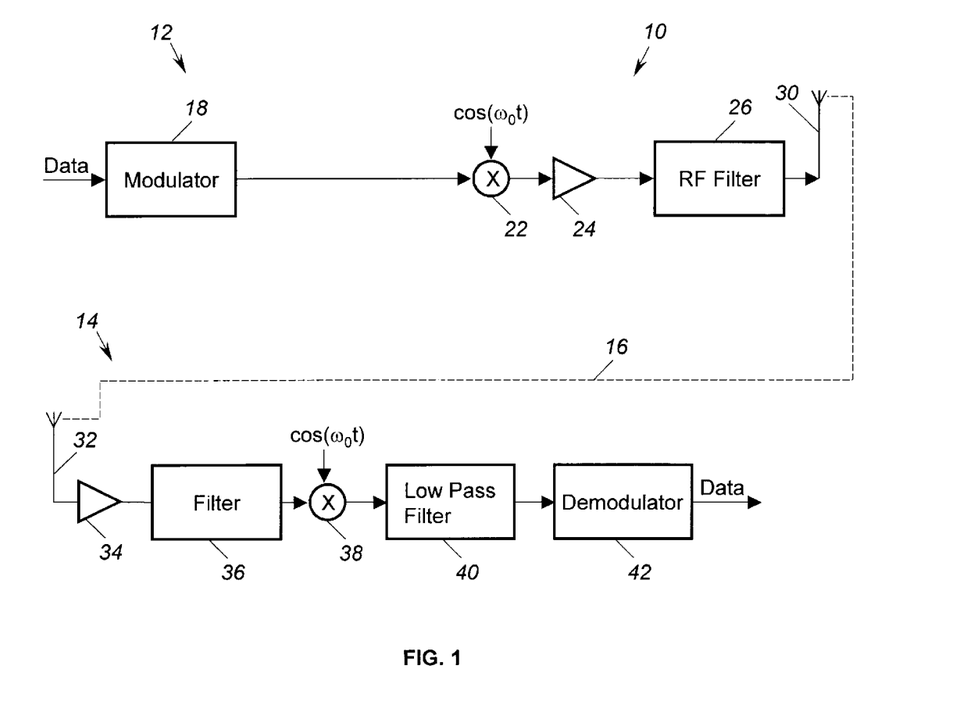
FIG. 1 is a schematic block diagram of a communications system arranged in accordance with the principles of the present invention.

FIG. 1 depicts a block diagram of communications system 10 for exchanging modulated data between a transmitter 12 and a receiver 14 via a communications link 16. Communications link 16 may be an air link for satellite communications or hard-wired interconnection, such as an electrical connection or fiber optic connection. Transmitter 12 includes a modulator 18. Modulator 18 receives a data stream at a baseband frequency and modulates the data stream utilizing a quadrature amplitude modulation (QAM) format. In particular, modulator 18 modulates the data utilizing a M-ary QAM modulation format, such as a 128-ary modulation communications system as will be described herein.

Typically modulator 18 modulates data bits of the data stream onto an analog carrier wave using mixer 22. During modulation, modulator 18 identifies for each bit pattern a symbol that includes an in-phase and quadrature-phase component, and maps the symbols into a 128-ary constellation pattern, as will be described in greater detail herein. Modulator 18 may be any quadrature amplitude modulator suitable for implementing the 128-ary constellations as described herein.

Modulator 18 outputs a radio frequency (RF) signal at a baseband frequency. Typically for satellite communications, the RF signal is up-converted to a high frequency for transmission. A mixer 22 up-converts the baseband frequency with a high frequency signal, such as $\cos(\omega_o t)$. Mixer 22 up-converts the in-phase and quadrature-phase representation of the complex voltage from modulator 18 to a single high frequency RF signal. The up-converted RF signal is then applied to amplifier 24 to significantly increase the signal gain for transmission. Operation of the mixing step and amplification step for a transmitter of this type is well understood by those skilled in the art. The up-converted, amplified signal from amplifier 24 is applied to RF filter 26 for subsequent RF filtering, such as may be required by Federal Communications Commission (FCC) requirements. The filtered signal is output to an antenna 30 for transmission to receiver 14.

In the configuration of FIG. 1, amplifier 24 introduces a distortion into the signal output by modulator 18. The output for amplifier 24, which is applied to RF filter 26 has an inherent distortion. Modulator 18 operates so as to introduce a predistortion into the signal output by modulator 18 and applied to mixer 22. Amplifier 24 thus adjusts the predistorted signal to output a distortion compensated signal input to RF filter 26.

Antenna 30 receives the filtered signal and outputs over communications link 16 a communications signal which is received by antenna 32 of transmitter 12. Antenna 32 is connected to an amplifier 34, which is preferably a low-noise, linear amplifier. Note that although communication system 10 is shown as having a wireless communications link 16, communications link 16 may be a hard-wired connection, as described above. In such a situation, antennas 30 and 32 are unnecessary.

The signal received by antenna 32 at receiver 14 is input to a filter 36. Filter 36 provides initial filtering of the received signal to filter channel noise and the like. Typically, filter 36 is closely matched to the transmitted signal frequency. The output of filter 36 is applied to a mixer 38 to down-convert the RF signal to an intermediate frequency signal by mixing the RF signal with a high frequency $\cos(\omega_o t)$ signal. The down-converted signal from mixer 38 includes baseband in-phase and quadrature-phase components. The down-converted signal is applied to low-pass filter 40 to provide filtering at baseband frequencies. Thus, in receiver 14, filter 36 acts as a course filter.

The filtered baseband signal from low-pass filter 40 is applied to a demodulator 42. Demodulator 42 demodulates the received signal in accordance with the M-ary QAM format implemented in modulator 18. Demodulator 42 thus outputs the data initially modulated by modulator 18.

Figure 2:
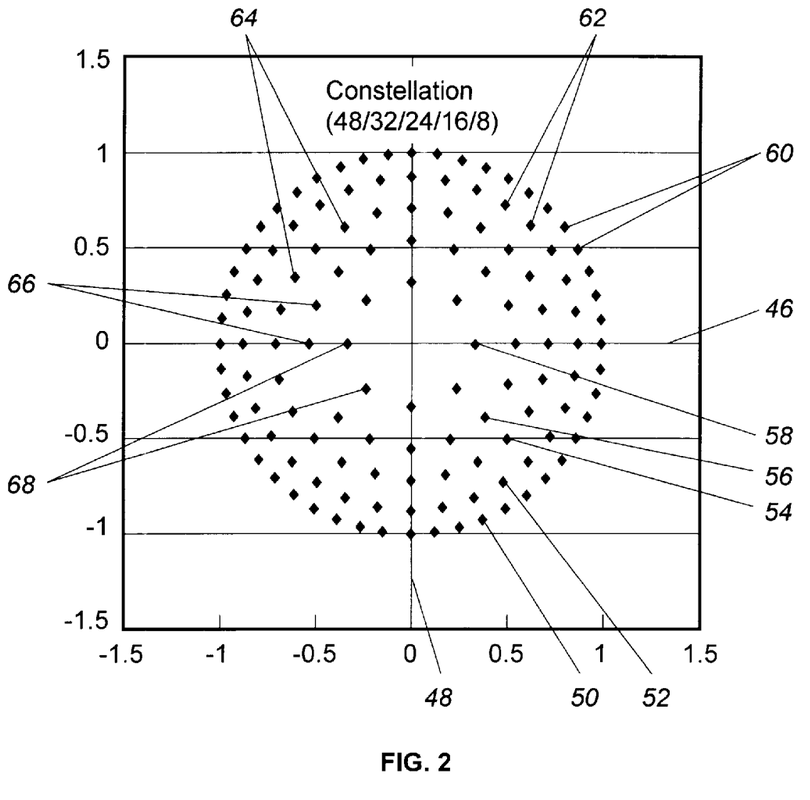
FIG. 2 is a constellation diagram for a first 128-ary modulation communications system.

In a particular feature of the subject invention, FIG. 2 depicts a 128-ary QAM constellation arranged on a Cartesian coordinate system defined by an in-phase axis 46 and quadrature-phase axis 48. The 128-ary constellation of FIG. 2 includes 5 amplitude levels: a first amplitude level 50, a second amplitude level 52, a third amplitude level 54, a fourth amplitude level 56, and a fifth amplitude level 58. First amplitude level 50 has an amplitude greater than second amplitude level 52; second amplitude level 52 has an amplitude greater than third amplitude level 54; third amplitude level 54 has an amplitude greater than fourth amplitude level 56; and fourth amplitude level 56 has an amplitude greater than fifth amplitude level 58. The amplitude levels 50, 52, 54, 56, 58 define concentric circles. Each amplitude level represents differing power levels for driving amplifier 24 of FIG. 1. First amplitude level 50 represents the peak power of amplifier 24, and the remaining amplitude levels 52, 54, 56, 58 represent a power level less than the peak power of amplifier 24. First amplitude level 50 includes first amplitude symbols 60, second amplitude level 52 includes second amplitude symbols 62, third amplitude level 54 includes third amplitude symbols 64, fourth amplitude level 56 includes fourth amplitude symbols 66, and fifth amplitude level 58 includes fifth amplitude symbols 68.

In the 128-ary constellation of FIG. 2, first amplitude level 50 includes 48 first amplitude symbols 60, second amplitude level 52 includes 32 second amplitude symbols 62, third amplitude level 54 includes 24 third amplitude symbols 64, fourth amplitude level 56 includes 16 fourth amplitude symbols 66, and fifth amplitude level 58 includes 8 fifth amplitude symbols 68. First amplitude level 50 has a unit radius of 1, second amplitude level 52 has a radius of 0.87, third amplitude level 54 has a radius of 0.71, fourth amplitude level 56 has a radius of 0.54, and fifth amplitude level 58 has a radius of 0.33. Upper amplitude symbols 60 are separated along first amplitude level 50 by 7.5° with one first amplitude symbols 54 located at Cartesian coordinates x=1 and y=0, (1,0). Second, amplitude symbols 62 are arranged along second amplitude level 52 and are separated by 11.25°, with one second amplitude symbol 62 located at Cartesian coordinate x=0.875 and y=0, (0.875, 0). Third amplitude symbols 64 are arranged along third amplitude level 54 and are separated by 15°, with one third amplitude symbol 64 located at Cartesian coordinate x=0.711 and y=0 (0.711, 0). Fourth amplitude symbols 64 are arranged along fourth amplitude level 54 and are separated by 22.5°, with one fourth amplitude symbol 64 located at Cartesian coordinate x=0.544 and y=0 (0.544, 0). Fifth amplitude symbols 68 are arranged along fifth amplitude level 58 and are separated by 45°, with one fifth amplitude symbol 68 located at Cartesian coordinate x=0.332 and y=0 (0.332, 0). The 128-ary constellation enables modulation of an 7 bit word or symbol. To implement a practical 128-ary system requires mapping of a large number of binary bits (M) to a number (M/7) of 128-ary symbols. The minimum distance between any pair of signal points is 0.125.

The arrangement of symbols on each amplitude level is particularly selected to maximize the number of points in which amplifier 24 can operate at saturation. In particular, by placing the maximum number of points on first amplitude level 50, amplifier 24 operates in saturation mode for transmission of the maximum number of symbols. The symbols placed on the other amplitude levels represent operation of amplifier 24 in a backed-off mode. However, due to signal-to-noise-ratio (SNR) considerations, not all points can be placed on first amplitude level 50. Arranging and placing symbols on each of first amplitude level 50 and other amplitude levels 52, 54, 56, 58 preferably maximizes the number of symbols for which amplifier 24 operates in saturation mode while pursuing good performance in the presence of noise.

Figure 3:
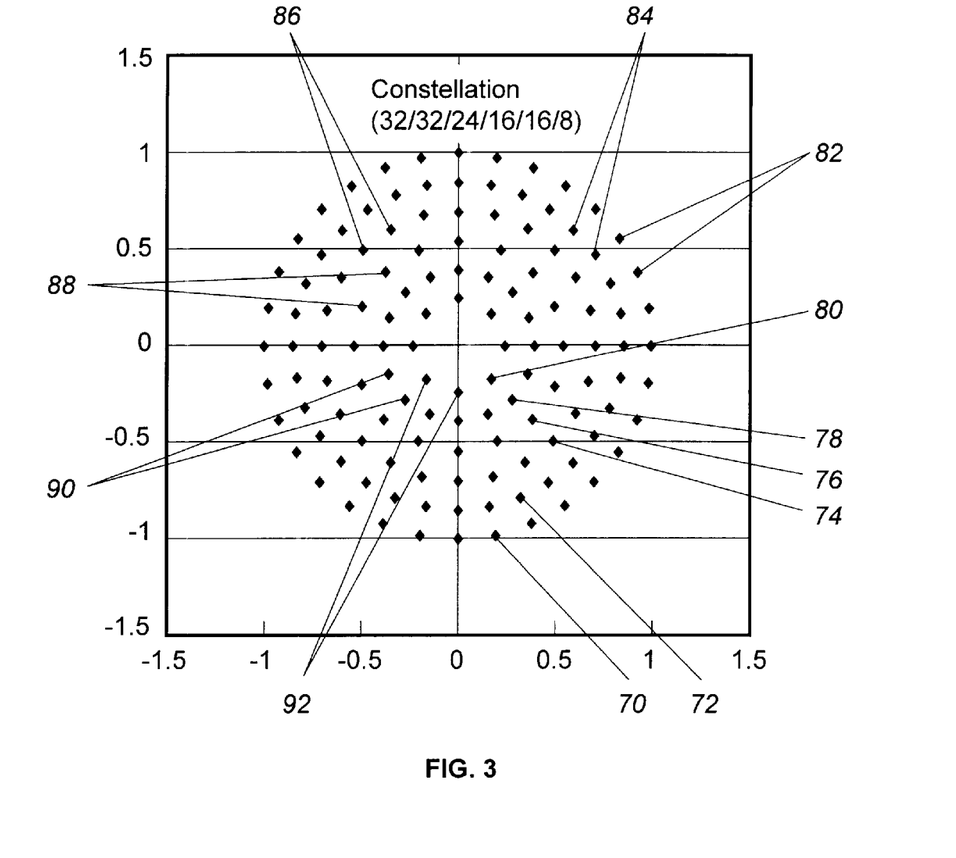
FIG. 3 is a constellation diagram for a second 128-ary, modulation communications system.

FIG. 3 depicts a constellation similar to FIG. 2, but shows six level 128-ary constellation for use by modulator 18 of FIG. 1. The 128-ary constellation of FIG. 3 also enables modulation of up to a 7 bit word or symbol. The 128-ary constellation of FIG. 3 includes six amplitude levels: a first amplitude level 70, a second amplitude level 72, a third amplitude level 74, a fourth amplitude level 76, a fifth amplitude level 78, and a sixth amplitude level 80. First amplitude level 70 has an amplitude greater than second amplitude level 72; second amplitude level 72 has an amplitude greater than third amplitude level 74; third amplitude level 74 has an amplitude greater than fourth amplitude level 76; fourth amplitude level 76 has an amplitude greater than fifth amplitude level 78; and fifth amplitude level 78 has an amplitude greater than sixth amplitude level 80. The amplitude levels 70, 72, 74, 76, 78, 80 defines six concentric circles. First amplitude level 70 includes first amplitude symbols 82, second amplitude level 72 includes second amplitude symbols 84, third amplitude level 74 includes third amplitude symbols 86, fourth amplitude level 76 includes fourth amplitude symbols 88, fifth amplitude level 78 includes fifth amplitude symbols 90, and sixth amplitude level 80 includes sixth amplitude symbols 92. First amplitude level 70 has a unit radius of 1; second amplitude level 72 has a radius of 0.85; third amplitude level 74 has a radius of 0.70; fourth amplitude level 76 has a radius of 0.54; fifth amplitude level 78 has a radius of 0.39; and sixth amplitude level 80 has a radius of 0.24. First amplitude level 70 includes 32 first amplitude symbols 82; second amplitude level 72 includes 32 second amplitude symbols 84; third amplitude level 74 includes 24 third amplitude symbols 86; fourth amplitude level 76 includes 16 fourth amplitude symbols 88; fifth amplitude levels 78 includes 16 fifth amplitude symbols 90; and sixth amplitude level 80 includes 8 sixth amplitude symbols 92.

The following chart lists the position of each of the 128 points of FIG. 3 in polar coordinates and in Cartesian coordinates.

| Symbol | Radius | Angle | X | Y |
|---|---|---|---|---|
| 1 | 1 | 0 | 1 | 0 |
| 2 | 1 | 11.25 | 0.98 | 0.2 |
| 3 | 1 | 22.5 | 0.92 | 0.38 |
| 4 | 1 | 33.75 | 0.83 | 0.56 |
| 5 | 1 | 45 | 0.71 | 0.71 |
| 6 | 1 | 56.25 | 0.56 | 0.83 |
| 7 | 1 | 67.5 | 0.38 | 0.92 |
| 8 | 1 | 78.75 | 0.2 | 0.98 |
| 9 | 1 | 90 | 0 | 1 |
| 10 | 1 | 101.25 | −0.2 | 0.98 |
| 11 | 1 | 112.5 | −0.38 | 0.92 |
| 12 | 1 | 123.75 | −0.56 | 0.83 |

-continued

| Symbol | Radius | Angle | X | Y |
|---|---|---|---|---|
| 13 | 1 | 135 | −0.71 | 0.71 |
| 14 | 1 | 146.25 | −0.83 | 0.56 |
| 15 | 1 | 157.5 | −0.92 | 0.38 |
| 16 | 1 | 168.75 | −0.98 | 0.2 |
| 17 | 1 | 180 | −1 | 0 |
| 18 | 1 | 191.25 | −0.98 | −0.2 |
| 19 | 1 | 202.5 | −0.92 | −0.4 |
| 20 | 1 | 213.75 | −0.83 | −0.6 |
| 21 | 1 | 225 | −0.71 | −0.7 |
| 22 | 1 | 236.25 | −0.56 | −0.8 |
| 23 | 1 | 247.5 | −0.38 | −0.9 |
| 24 | 1 | 258.75 | −0.2 | −1 |
| 25 | 1 | 270 | 0 | −1 |
| 26 | 1 | 281.25 | 0.2 | −1 |
| 27 | 1 | 292.5 | 0.38 | −0.9 |
| 28 | 1 | 303.75 | 0.56 | −0.8 |
| 29 | 1 | 315 | 0.71 | −0.7 |
| 30 | 1 | 326.25 | 0.83 | −0.6 |
| 31 | 1 | 337.5 | 0.92 | −0.4 |
| 32 | 1 | 348.75 | 0.98 | −0.2 |
| 33 | 0.9 | 0 | 0.85 | 0 |
| 34 | 0.9 | 11.25 | 0.83 | 0.17 |
| 35 | 0.9 | 22.5 | 0.79 | 0.33 |
| 36 | 0.9 | 33.75 | 0.71 | 0.47 |
| 37 | 0.9 | 45 | 0.6 | 0.6 |
| 38 | 0.9 | 56.25 | 0.47 | 0.71 |
| 39 | 0.9 | 67.5 | 0.33 | 0.79 |
| 40 | 0.9 | 78.75 | 0.17 | 0.83 |
| 41 | 0.9 | 90 | 0 | 0.85 |
| 42 | 0.9 | 101.25 | −0.17 | 0.83 |
| 43 | 0.9 | 112.5 | −0.33 | 0.79 |
| 44 | 0.9 | 123.75 | −0.47 | 0.71 |
| 45 | 0.9 | 135 | −0.6 | 0.6 |
| 46 | 0.9 | 146.25 | −0.71 | 0.47 |
| 47 | 0.9 | 157.5 | −0.79 | 0.33 |
| 48 | 0.9 | 168.75 | −0.83 | 0.17 |
| 49 | 0.9 | 180 | −0.85 | 0 |
| 50 | 0.9 | 191.25 | −0.83 | −0.2 |
| 51 | 0.9 | 202.5 | −0.79 | −0.3 |
| 52 | 0.9 | 213.75 | −0.71 | −0.5 |
| 53 | 0.9 | 225 | −0.6 | −0.6 |
| 54 | 0.9 | 236.25 | −0.47 | −0.7 |
| 55 | 0.9 | 247.5 | −0.33 | −0.8 |
| 56 | 0.9 | 258.75 | −0.17 | −0.8 |
| 57 | 0.9 | 270 | −0 | −0.9 |
| 58 | 0.9 | 281.25 | 0.17 | −0.8 |
| 59 | 0.9 | 292.5 | 0.33 | −0.8 |
| 60 | 0.9 | 303.75 | 0.47 | −0.7 |
| 61 | 0.9 | 315 | 0.6 | −0.6 |
| 62 | 0.9 | 326.25 | 0.71 | −0.5 |
| 63 | 0.9 | 337.5 | 0.79 | −0.3 |
| 64 | 0.9 | 348.75 | 0.83 | −0.2 |
| 65 | 0.7 | 0 | 0.7 | .0 |
| 66 | 0.7 | 15 | 0.68 | 0.18 |
| 67 | 0.7 | 30 | 0.61 | 0.35 |
| 68 | 0.7 | 45 | 0.49 | 0.49 |
| 69 | 0.7 | 60 | 0.35 | 0.61 |
| 70 | 0.7 | 75 | 0.18 | 0.68 |
| 71 | 0.7 | 90 | 0 | 0.7 |
| 72 | 0.7 | 105 | −0.18 | 0.68 |
| 73 | 0.7 | 120 | −0.35 | 0.61 |
| 74 | 0.7 | 135 | −0.49 | 0.49 |
| 75 | 0.7 | 150 | −0.61 | 0.35 |
| 76 | 0.7 | 165 | −0.68 | 0.18 |
| 77 | 0.7 | 180 | −0.7 | 0 |
| 78 | 0.7 | 195 | −0.68 | −0.2 |
| 79 | 0.7 | 210 | −0.61 | −0.4 |
| 80 | 0.7 | 225 | −0.49 | −0.5 |
| 81 | 0.7 | 240 | −0.35 | −0.6 |
| 82 | 0.7 | 255 | −0.18 | −0.7 |
| 83 | 0.7 | 270 | −0 | −0.7 |
| 84 | 0.7 | 285 | 0.18 | −0.7 |
| 85 | 0.7 | 300 | 0.35 | −0.6 |
| 86 | 0.7 | 315 | 0.49 | −0.5 |
| 87 | 0.7 | 330 | 0.61 | −0.4 |
| 88 | 0.7 | 345 | 0.68 | −0.2 |
| 89 | 0.5 | 0 | 0.54 | 0 |

-continued

| Symbol | Radius | Angle | X | Y |
|---|---|---|---|---|
| 90 | 0.5 | 22.5 | 0.5 | 0.21 |
| 91 | 0.5 | 45 | 0.38 | 0.38 |
| 92 | 0.5 | 67.5 | 0.21 | 0.5 |
| 93 | 0.5 | 90 | 0 | 0.54 |
| 94 | 0.5 | 112.5 | −0.21 | 0.5 |
| 95 | 0.5 | 135 | −0.38 | 0.38 |
| 96 | 0.5 | 157.5 | −0.5 | 0.21 |
| 97 | 0.5 | 180 | −0.54 | 0 |
| 98 | 0.5 | 202.5 | −0.5 | −0.2 |
| 99 | 0.5 | 225 | −0.38 | −0.4 |
| 100 | 05 | 247.5 | −0.21 | −0.5 |
| 101 | 0.5 | 270 | −0 | −0.5 |
| 102 | 0.5 | 292.5 | 0.21 | −0.5 |
| 103 | 0.5 | 315 | 0.38 | −0.4 |
| 104 | 0.5 | 337.5 | 0.5 | −0.2 |
| 105 | 0.4 | 0 | 0.39 | 0 |
| 106 | 0.4 | 22.5 | 0.36 | 0.15 |
| 107 | 0.4 | 45 | 0.28 | 0.28 |
| 108 | 0.4 | 67.5 | 0.15 | 0.36 |
| 109 | 0.4 | 90 | 0 | 0.39 |
| 110 | 0.4 | 112.5 | −0.15 | 0.36 |
| 111 | 0.4 | 135 | −0.28 | 0.28 |
| 112 | 0.4 | 157.5 | −0.36 | 0.15 |
| 113 | 0.4 | 180 | −0.39 | 0 |
| 114 | 0.4 | 202.5 | −0.36 | −0.1 |
| 115 | 0.4 | 225 | −0.28 | −0.3 |
| 116 | 0.4 | 247.5 | −0.15 | −0.4 |
| 117 | 0.4 | 270 | −0 | −0.4 |
| 118 | 0.4 | 292.5 | 0.15 | −0.4 |
| 119 | 0.4 | 315 | 0.28 | −0.3 |
| 120 | 0.4 | 337.5 | 0.36 | −0.1 |
| 121 | 0.2 | 0 | 0.24 | 0 |
| 122 | 0.2 | 45 | 0.17 | 0.17 |
| 123 | 0.2 | 90 | 0 | 0.24 |
| 124 | 0.2 | 135 | −0.17 | 0.17 |
| 125 | 0.2 | 180 | −0.24 | 0 |
| 126 | 0.2 | 225 | −0.17 | −0.2 |
| 127 | 0.2 | 270 | −0 | −0.2 |
| 128 | 0.2 | 315 | 0.17 | −0.2 |

Symbols 1–32 define first amplitude symbols 82; symbols 33–64 define second amplitude symbols 84; symbols 65–88 define third amplitude symbols 86; symbols 89–103 define fourth amplitude symbols 88; symbols 105–120 define fifth amplitude symbols 90; and symbols 121–128 define sixth amplitude symbols 92. As can be seen in the chart, each first amplitude symbol 82 is separated by 11.25°; each second amplitude symbol 84 is separated by 11.25°; each third amplitude symbol 86 is separated by 15°; each fourth amplitude symbols 88 and each fifth amplitude symbol 90 are separated by 22.5°; and each fifth amplitude symbol is separated by 45°. The minimum distance between any pair of signal points is 0.150.

Similarly to FIG. 2, amplitude levels 70, 72, 74, 76, 78, 80 are selected to maximize the number of symbols for which amplifier 24 operates in saturation. Further, lower amplitude levels 72, 74, 76, 78, 80 are selected so that amplifier 24 operates as efficiently as possible when amplifying the symbols placed on these levels. Further yet, the symbols are selected in order to provide suitable signal-to-noise ratios for the symbols placed on each respective amplitude level.

Figure 4:
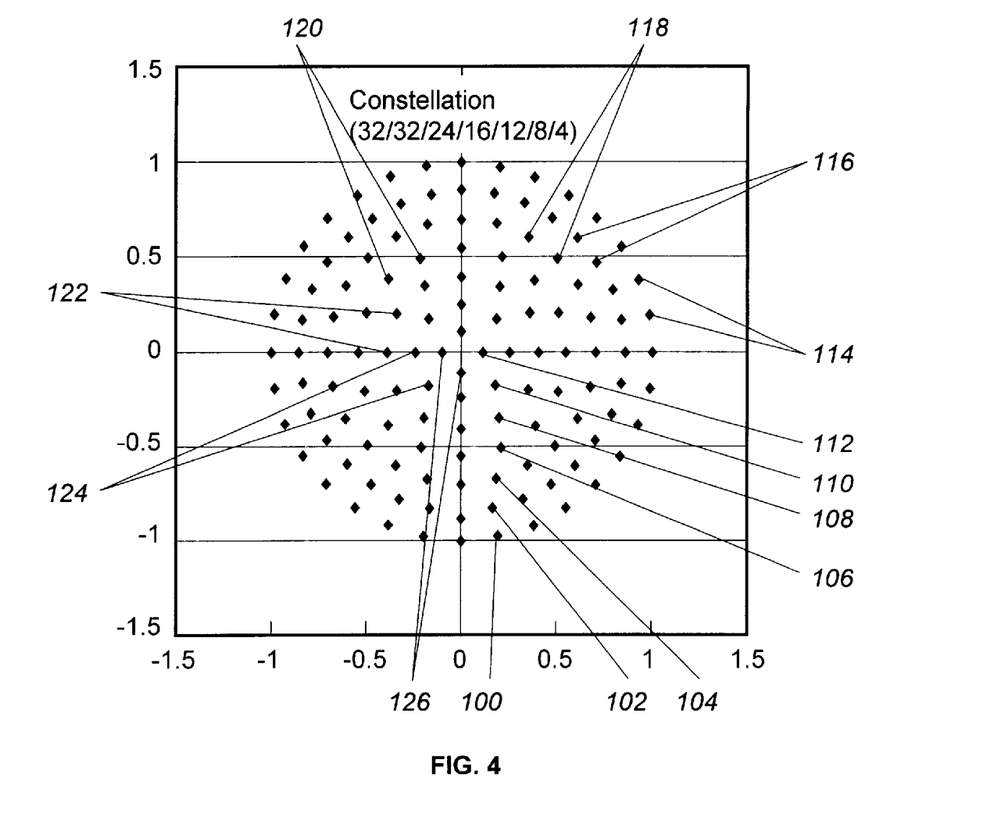
FIG. 4 is a constellation diagram for a third 128-ary, modulation communications system.

FIG. 4 depicts a 7 level 128-ary constellation utilized for QAM by modulator 18. The 128-ary constellation is depicted as a seven level constellation on a Cartesian coordinate system having an in-phase axis 46 and a quadrature-phase axis 48. The 128-ary constellation includes a first amplitude level 100, a second amplitude level 102, a third amplitude level 104, a fourth amplitude level 106, a fifth amplitude level 108, a sixth amplitude level 110, and a seventh amplitude level 112. Similarly as previously described, each respective amplitude level has a plurality of first amplitude symbols 114, second amplitude symbols 116, third amplitude symbols 118, fourth amplitude symbols 120, fifth amplitude symbols 122, sixth amplitude symbols 124, and seventh amplitude symbols 126.

First amplitude level 100 has a radius of 1; second amplitude level 102 has a radius of 0.85; third amplitude level 104 has a radius of 0.70; fourth amplitude level 106 has a radius of 0.55; fifth amplitude level 108 has a radius of 0.4; sixth amplitude level 110 has a radius of 0.25; and sixth amplitude level 112 has a radius of 0.10. First amplitude level 100 includes 32 first amplitude symbols 114; second amplitude level 102 includes 24 second amplitude symbols 116; third amplitude level 104 includes 24 third amplitude symbols 118; fourth amplitude level 106 includes 16 fourth amplitude symbols 120; fifth amplitude level 108 includes 12 fifth amplitude symbols 122; sixth amplitude level 110 includes 8 sixth amplitude symbols 124; and seventh amplitude level 112 includes 4 seventh amplitude symbols 126. First amplitude symbols 114 are separated by 11.25°, with one first amplitude symbols 114 falling at Cartesian coordinates x=0.1 and y=0 (1, 0). Second amplitude symbols 116 are separated by 11.25°, with one second amplitude symbols 116 being located at x=0.85 and y=0 (0.85, 0). Third amplitude symbols 116 are separated by 15°, with one third amplitude symbol 118 located at x=0.7 and y=0, (0.7, 0). Fourth amplitude symbols 120 are separated by 22.5°, with one fourth amplitude symbol 120 being located at x=0.55 and y=0, (0.55, 0). Fifth amplitude symbols 122 are separated by 30°, with one fifth amplitude symbol 122 being located at x=0.4 and y=0 (0.4, 0). Sixth amplitude symbols 124 are separated by 45°, with one fifth amplitude symbol 122 being located at x=0.25 and y=0 (0.25, 0). Seventh amplitude symbols 126 are separated by 90°, with one seventh amplitude symbol 126 being located at x=0.104 and y=0 (0.104, 0).

Figure 5:
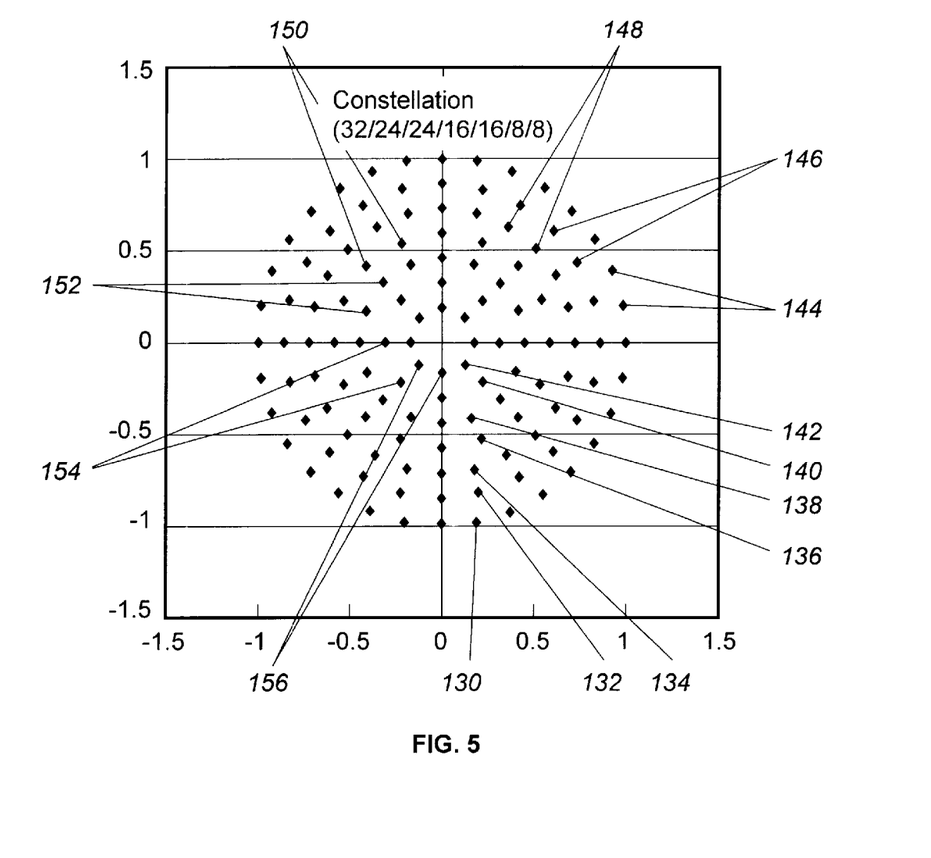
FIG. 5 is a constellation diagram for a fourth 128-ary, modulation communications system.

FIG. 5 depicts a second implementation of a seven level 128-ary constellation. The 128-ary constellation of FIG. 5 includes a first amplitude level 130, a second amplitude level 132, a third amplitude level 134, a fourth amplitude level 136, a fifth amplitude level 138, a sixth amplitude level 140, and a seventh amplitude level 142. The respective amplitude levels include respective first amplitude symbols 144, second amplitude symbols 146, third amplitude symbols 148, fourth amplitude symbols 150, fifth amplitude symbols 152, sixth amplitude symbols 154, and seventh amplitude symbols 156. First amplitude level 130 has a unit radius of 1; second amplitude level 132 has a radius of 0.85; third amplitude level 134 has a radius of 0.72; fourth amplitude level 136 has a radius of 0.58; fifth amplitude level 138 has a radius of 0.45; sixth amplitude level 140 has a radius of 0.31; and seventh amplitude level 142 has a radius of 0.18. First amplitude level 130 has 32 first amplitude symbols 144; second amplitude level 132 has 24 second amplitude symbols 146; third amplitude level 134 has 24 third amplitude symbols 148; fourth amplitude level 136 has 16 fourth amplitude symbols 150; fifth amplitude level 138 has 16 fifth amplitude symbols 152; sixth amplitude level 140 has 8 sixth amplitude symbols 154; and seventh amplitude level 142 has 8 seventh amplitude symbols 156.

First amplitude symbols 144 are separated by 11.25°, with one first amplitude symbol 144 located at coordinates x=1, y=0, (1, 0). Second amplitude symbols 146 are separated by 15°, with a second amplitude symbol 146 located at coordinates x=0.85, y=0 (0.85, 0). Third amplitude symbols 148 are separated by 15°, with one third amplitude symbol 148 being located at coordinates x=0.716 and y=0 (0.716, 0). Fourth amplitude symbols 150 are separated by 22.5°, with one fourth amplitude symbol 150 located at coordinate x=0.581, y=0, (0.581, 0). Fifth amplitude symbols 152 are separated by 22.5°, with one fifth amplitude symbol 152 located at Cartesian coordinates x=0.446 and y=0, (0.446, 0). Sixth amplitude symbols 154 are separated by 45°, with one sixth amplitude symbol 154 located at Cartesian coordinates x=0.311 and y=0, (0.311, 0). Seventh amplitude symbols 156 are separated by 45°, with one sixth amplitude symbols 156 located at Cartesian coordinates x=0.177 and y=0 (0.177, 0). The minimum distance between each point is 0.135.

Figure 6:
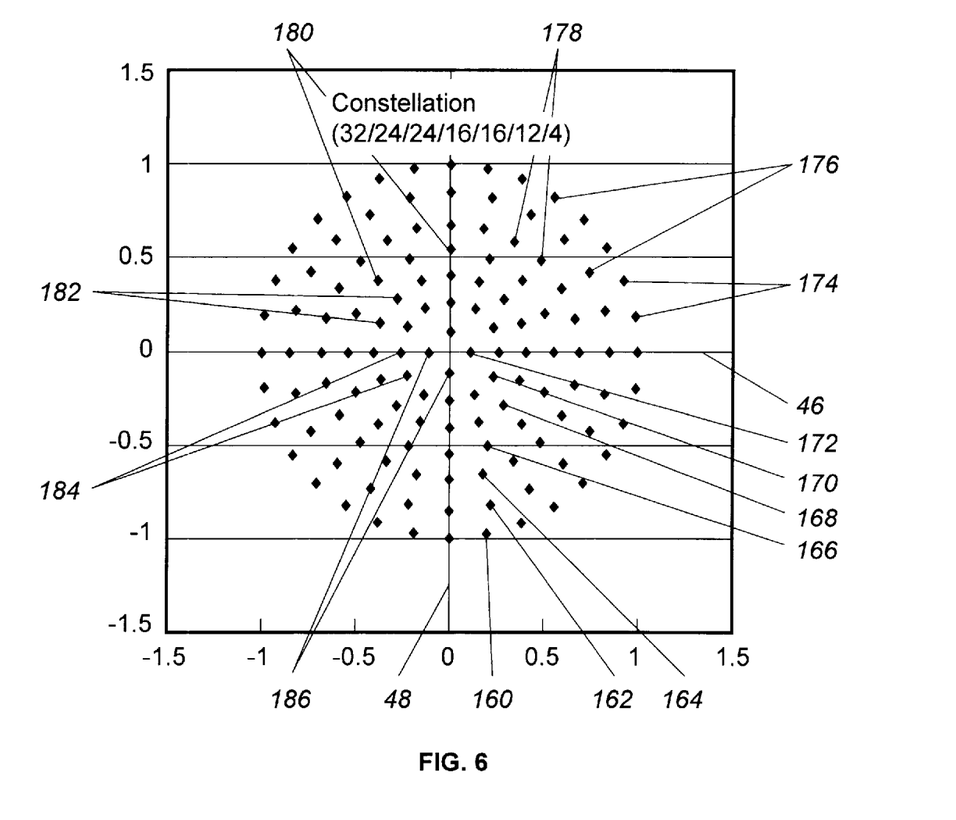
FIG. 6 is a constellation diagram for a fifth 128-ary, modulation communications system.

FIG. 6 depicts a third implementation of a seven level 128-ary constellation. The 128-ary constellation of FIG. 6 includes a first amplitude level 160, a second amplitude level 162, a third amplitude level 164, a fourth amplitude level 166, a fifth amplitude level 168, a sixth amplitude level 170, and a seventh amplitude level 172. The respective amplitude levels include respective first amplitude symbols 174, second amplitude symbols 176, third amplitude symbols 178, fourth amplitude symbols 180, fifth amplitude symbols 182, sixth amplitude symbols 184, and seventh amplitude symbols 186. First amplitude level 160 has a unit radius of 1; second amplitude level 162 has a radius of 0.85; third amplitude level 164 has a radius of 0.68; fourth amplitude level 166 has a radius of 0.54; fifth amplitude level 168 has a radius of 0.41; sixth amplitude level 170 has a radius of 0.27; and seventh amplitude level 172 has a radius of 0.11. First amplitude level 160 has 32 first amplitude symbols 174; second amplitude level 162 has 24 second amplitude symbols 176; third amplitude level 164 has 24 third amplitude symbols 178; fourth amplitude level 166 has 16 fourth amplitude symbols 180; fifth amplitude level 168 has 16 fifth amplitude symbols 182; sixth amplitude level 170 has 12 sixth amplitude symbols 184; and seventh amplitude level 172 has 4 seventh amplitude symbols 186.

First amplitude symbols 174 are separated by 11.25°, with one first amplitude symbol 174 located at coordinates x=1, y=0, (1, 0). Second amplitude symbols 176 are separated by 15°, with a second amplitude symbol 176 located at coordinates x=0.85, y=0 (0.85, 0). Third amplitude symbols 178 are separated by 15°, with one third amplitude symbol 178 being located at coordinates x=0.68 and y=0 (0.68, 0). Fourth amplitude symbols 180 are separated by 22.5°, with one fourth amplitude symbol 180 located at coordinate x=0.544, y=0, (0.544, 0). Fifth amplitude symbols 182 are separated by 22.5°, with one fifth amplitude symbol 182 located at Cartesian coordinates x=0.405 and y=0, (0.405, 0). Sixth amplitude symbols 184 are separated by 30°, with one sixth amplitude symbol 184 located at Cartesian coordinates x=0.268 and y=0, (0.268, 0). Seventh amplitude symbols 186 are separated by 90°, with one sixth amplitude symbols 186 located at Cartesian coordinates x=0.11 and y=0 (0.11, 0). The minimum distance between each point is 0.136.

The number of symbol and position of each symbol placed on the respective amplitude levels for each constellation described above is selected so that amplifier 24 operates at peak efficiency for the greatest number of symbols. Thus, the particular number of amplitude levels and the particular number of symbols placed on each amplitude level and the relative position of each symbol is specifically selected to maximize operation of amplifier 24.

The above-described invention utilizes concentric constellations to provide simple compensation amplitude distortion. By utilizing concentric constellations, the expansion of inner constellations is controlled by five, six, or seven settings, depending upon the number of amplitude levels for a 128-ary constellation. The spacing between symbols in each 128-ary constellation is selected to arrive at a suitable tradeoff between resolution and power and enables best use of available power. Further, fewer amplitude levels may be used when employing the teachings described herein. Further, when compared to conventional square constellations, the circular constellations defined herein utilize peak-power more efficiently.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A communications system, comprising:

a modulator for modulating a digital data stream onto a carrier wave to generate a modulated signal, the modulator converting data in the data stream into symbols for transmission by the communications system, the symbols being encoded into one of M possible symbols of an M-ary constellation, wherein each symbol is defined by one of a plurality of phases and one of a plurality of magnitudes; and an amplifier for amplifying the modulated signal prior to transmission to generate an amplified signal, the amplifier having a non-linear characteristic that generates a non-linear distortion in the modulated signal, wherein the M-ary constellation is a 128 point constellation having 48 points defined by a first magnitude, 32 points defined by a second magnitude, 24 points defined by a third magnitude, 16 points defined by a fourth magnitude, and 8 points defined by a fifth magnitude, wherein the second magnitude is less than the first magnitude, the third magnitude is less than the second magnitude, the fourth magnitude is less than the third magnitude, and the fifth magnitude is less than the fourth magnitude.

2. The communications system of claim 1 wherein the amplifier has a gain which differs for each amplitude.

3. The communications system of claim 1 wherein the amplifier has a predetermined, non-linear characteristic and the constellation varies in accordance with the non-linear characteristic.

4. The communications system of claim 1 wherein the minimum distance between each point in the constellation is 0.125.

5. A communications system, comprising:

a modulator for modulating a digital data stream onto a carrier wave to generate a modulated signal, the modulator converting data in the data stream into symbols for transmission by the communications system, the symbols being encoded into one of M possible symbols of an M-ary constellation, wherein each symbol is defined by one of a plurality of phases and one of a plurality of magnitudes; and an amplifier for amplifying the modulated signal prior to transmission to generate an amplified signal, the amplifier having a non-linear characteristic that generates a non-linear distortion in the modulated signal, wherein the M-ary constellation is a 128 point constellation having 32 points defined by a first magnitude, 32 points defined by a second magnitude, 24 points defined by a third magnitude, 16 points defined by a fourth magnitude, 16 points defined by a fifth magnitude, and 8 points defined by a sixth magnitude, wherein the second magnitude is less than the first magnitude, the third magnitude is less than the second magnitude, the fourth magnitude is less than the third magnitude, the fifth magnitude is less than the fourth magnitude, and the sixth magnitude is less than the fifth magnitude.

6. The communications system of claim 5 wherein the amplifier has a gain which differs for each amplitude.

7. The communications system of claim 5 wherein the amplifier has a predetermined, non-linear characteristic and the constellation varies in accordance with the non-linear characteristic.

8. The communications system of claim 5 wherein the minimum distance between each symbol in the constellation is 0.150.

9. A communications system, comprising:

a modulator for modulating a digital data stream onto a carrier wave to generate a modulated signal, the modulator converting data in the data stream into symbols for transmission by the communications system, the symbols being encoded into one of M possible symbols of an M-ary constellation, wherein each symbol is defined by one of a plurality of phases and one of a plurality of magnitudes; and an amplifier for amplifying the modulated signal prior to transmission to generate an amplified signal, the amplifier having a non-linear characteristic that generates a non-linear distortion in the modulated signal, wherein the M-ary constellation is a 128 point constellation having a first set of points defined by a first magnitude, a second set of points defined by a second magnitude, a third set of points defined by a third magnitude, a fourth set of points defined by a fourth magnitude, a fifth set of points defined by a fifth magnitude, a sixth set of points defined by a sixth magnitude, and a seventh set of paints defined by a seventh magnitude, wherein the second magnitude is less than the first magnitude, the third magnitude is less than the second magnitude, the fourth magnitude is less than the third magnitude, the fifth magnitude is less than the fourth magnitude, the sixth magnitude is less than the fifth magnitude, and the seventh magnitude is less than the sixth magnitude.

10. The communications system of claim 9 wherein the amplifier has a gain which differs for each amplitude.

11. The communications system of claim 9 wherein the amplifier has a predetermined, non-linear characteristic and the constellation varies in accordance with the non-linear characteristic.

12. A communications system of claim 9 wherein the first set of points comprises 32 points, the second set of points comprises 32 points, the third set of points comprises 24 points, the fourth set of points comprises 16 points, the fifth set of points comprises 12 points, the sixth set of points comprises 8 points, and the seventh set of points comprises 4 points.

13. The communications system of claim 12 wherein the minimum distance between each point is 0.146.

14. A communications system of claim 9 wherein the first set of points comprises 32 points, the second set of points comprises 24 points, the third set of points comprises 24 points, the fourth set of points comprises 16 points, the fifth set of points comprises 16 points, the sixth set of points comprises 8 points, and the seventh set of points comprises eight points.

15. The communications system of claim 12 wherein the minimum distance between each point is 0.135.

16. A communications system of claim 9 wherein the first set of points comprises 32 points, the second set of points comprises 24 points, the third set of points comprises 24 points, the fourth set of points comprises 16 points, the fifth set of points comprises 16 points, the sixth set of points comprises 12 points, and the seventh set of points comprises 4 points.

17. The communications system of claim 12 wherein the minimum distance between each point is 0.136.

18. A method of encoding data comprising the steps of:

modulating a digital data stream onto a carrier wave to generate a modulated signal, the step of modulating converting data in the data stream into bit symbols, the bit symbols being encoded into one of M possible bit symbols of an M-ary constellation, wherein each bit symbol is defined by one of a plurality of phases and one of a plurality of magnitudes; and amplifying the modulated signal prior to transmission to generate an amplified signal, the step of amplifying introducing a non-linear characteristic that generates a non-linear distortion in the modulated signal, wherein the M-ary constellation is a 128 point constellation having 48 points defined by a first magnitude, 32 points defined by a second magnitude, 24 points defined by a third magnitude, 16 points defined by a fourth magnitude, and 8 points defined by a fifth magnitude, wherein the second magnitude is less than the first magnitude, the third magnitude is less than the second magnitude, the fourth magnitude is less than the third magnitude, and the fifth magnitude is less than the fourth magnitude.

19. The method of claim 18 wherein the minimum distance between each point is 0.125.

20. A method of encoding data comprising the steps of:

modulating a digital data stream onto a carrier wave to generate a modulated signal, the step of modulating converting data in the data stream into bit symbols, the bit symbols being encoded into one of M possible bit symbols of an M-ary constellation, wherein each bit symbol is defined by one of a plurality of phases and one of a plurality of magnitudes; and amplifying the modulated signal prior to transmission to generate an amplified signal, the step of amplifying introducing a non-linear characteristic that generates a non-linear distortion in the modulated signal, wherein the M-ary constellation is a 128 point constellation having 32 points defined by a first magnitude, 32 points defined by a second magnitude, 24 points defined by a third magnitude, 16 points defined by a fourth magnitude, 16 points defined by a fifth magnitude, and 8 points defined by a sixth magnitude, wherein the second magnitude is less than the first magnitude, the third magnitude is less than the second magnitude, the fourth magnitude is less than the third magnitude, the fifth magnitude is less than the fourth magnitude and the sixth magnitude is less than the fifth magnitude.

21. The method of claim 20 wherein the minimum distance between each point is 0.150.

22. A method of encoding data comprising the steps of:

modulating a digital data stream onto a carrier wave to generate a modulated signal, the step of modulating converting data in the data stream into bit symbols, the bit symbols being encoded into one of M possible bit symbols of an M-ary constellation, wherein each bit symbol is defined by one of a plurality of phases and one of a plurality of magnitudes; and amplifying the modulated signal prior to transmission to generate an amplified signal, the step of amplifying introducing a non-linear characteristic that generates a non-linear distortion in the modulated signal, wherein the M-ary constellation is a 128 point constellation having a first set of points defined by a first magnitude, a second set of points defined by a second magnitude, a third set of points defined by a third magnitude, a fourth set of points defined by a fourth magnitude, and a fifth set of points defined by a fifth magnitude, a sixth set of points defined by a sixth magnitude, and a seventh set of points defined by a seventh magnitude wherein the second magnitude is less than the first magnitude, the third magnitude is less than the second magnitude, the fourth magnitude is less than the third magnitude, the fifth magnitude is less than the fourth magnitude, the sixth set of magnitude is less than the fifth magnitude, and the seventh magnitude is less than the sixth magnitude.

23. The method of claim 22 wherein the first set of points comprises 32 points, the second set of points comprises 32 points, the third set of points comprises 24 points, the fourth set of points comprises 16 points, the fifth set of points comprises 12 points, the sixth set of points comprises 8 points, and the seventh set of points comprises 4 points.

24. The method of claim 23 wherein the minimum distance between each point is 0.146.

25. A method of claim 22 wherein the first set of points comprises 32 points, the second set of points comprises 24 points, the third set of points comprises 24 points, the fourth set of points comprises 16 points, the fifth set of points comprises 16 points, the sixth set of points comprises 8 points, and the seventh set of points comprises 8 points.

26. The method of claim 25 wherein the minimum distance between each points is 0.135.

27. A method of claim 22 wherein the first set of points comprises 32 points, the second set of points comprises 24 points, the third set of points comprises 24 points, the fourth set of points comprises 16 points, the fifth set of points comprises 16 points, the sixth set of points comprises 12 points, and the seventh set of points comprises 4 points.

28. The method of claim 27 wherein the minimum distance between each points is 0.136.

* * * * *